United States Patent
Kim et al.

(10) Patent No.: US 12,090,845 B2
(45) Date of Patent: Sep. 17, 2024

(54) ELECTRONIC PEDAL APPARATUS

(71) Applicants: Hyundai Motor Company, Seoul (KR); Kia Corporation, Seoul (KR)

(72) Inventors: Eun Sik Kim, Gwangmyeong-si (KR); Wi Sang Park, Hwaseong-si (KR); Jae Hyun Cho, Suwon-si (KR); Jung Min Lee, Busan (KR); Seong Ju Jo, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 18/135,416

(22) Filed: Apr. 17, 2023

(65) Prior Publication Data
US 2024/0181874 A1    Jun. 6, 2024

(30) Foreign Application Priority Data
Dec. 5, 2022    (KR) ........................ 10-2022-0167909

(51) Int. Cl.
| | |
|---|---|
| *B60K 26/02* | (2006.01) |
| *B60T 7/04* | (2006.01) |
| *H01F 7/02* | (2006.01) |
| *H01F 7/20* | (2006.01) |

(52) U.S. Cl.
CPC ............ *B60K 26/02* (2013.01); *B60T 7/042* (2013.01); *H01F 7/0205* (2013.01); *H01F 7/20* (2013.01); *B60K 2026/026* (2013.01)

(58) Field of Classification Search
CPC .. B60K 2026/026; G05G 1/036; H01F 7/0236
See application file for complete search history.

(56) References Cited

U.S. PATENT DOCUMENTS

| | | | |
|---|---|---|---|
| 4,022,146 A | 5/1977 | Sadler | |
| 6,267,208 B1 * | 7/2001 | Koepff | B60T 7/042 |
| | | | 188/164 |
| 6,274,832 B1 * | 8/2001 | Tachibana | H01H 21/24 |
| | | | 335/207 |
| 6,318,208 B1 | 11/2001 | Thongs, Jr. et al. | |

(Continued)

FOREIGN PATENT DOCUMENTS

| | | |
|---|---|---|
| JP | 4022146 B2 | 12/2007 |
| KR | 10-1051091 B1 | 7/2011 |

(Continued)

OTHER PUBLICATIONS

USPTO Machine Translation (retrieved from FIT database) of the Description of KR 20210120154 A, Kim et al., Oct. 7, 2021. (Year: 2024).*

*Primary Examiner* — Daniel D Yabut
(74) *Attorney, Agent, or Firm* — Morgan, Lewis & Bockius LLP

(57) ABSTRACT

An electronic pedal apparatus is configured so that a driver may operate a pedal 200 with a small effort, the electronic pedal apparatus may operate by fine displacement during the operation of the pedals, the pedals apparatus may allow the driver to clearly recognize an operating situation of the pedals by use of a magnetic force (repulsive force) having a quadratic function graph, and a compact mechanism having a foldable function may be implemented by use of an electromagnet that changes in polarity.

19 Claims, 9 Drawing Sheets

(56) References Cited

U.S. PATENT DOCUMENTS

| | | |
|---|---|---|
| 7,954,398 B2 | 6/2011 | Lee et al. |
| 10,994,611 B1 * | 5/2021 | Kim .......................... G05G 5/28 |
| 2004/0103743 A1 * | 6/2004 | Takenaka ................. G05G 1/36 |
| | | 74/513 |
| 2015/0341030 A1 * | 11/2015 | De Saulles ........... G06F 3/0221 |
| | | 341/32 |
| 2016/0159216 A1 | 6/2016 | Konigorski et al. |
| 2016/0339886 A1 * | 11/2016 | MacArthur ........... B60T 8/4081 |
| 2018/0280099 A1 * | 10/2018 | Cone ........................ B25J 13/04 |

FOREIGN PATENT DOCUMENTS

| | | |
|---|---|---|
| KR | 10-1449859 B1 | 10/2014 |
| KR | 10-2020-0070946 A | 6/2020 |
| KR | 20210120154 A * | 10/2021 |
| WO | 02/38930 A1 | 5/2002 |

* cited by examiner

ELECTRONIC PEDAL APPARATUS

CROSS REFERENCE TO RELATED APPLICATION

The present application claims priority to Korean Patent Application No. 10-2022-0167909, filed Dec. 5, 2022, the entire contents of which is incorporated herein for all purposes by this reference.

BACKGROUND OF THE PRESENT DISCLOSURE

Field of the Present Disclosure

The present disclosure relates to a technology associated with an electronic pedal apparatus mounted in a vehicle and configured to generate an acceleration signal or a braking signal for a vehicle when a driver operates the electronic pedal apparatus.

Description of Related Art

An autonomous vehicle refers to a smart vehicle to which an autonomous driving technology is applied so that the vehicle autonomously arrives at a destination even though a driver does not directly manipulate a steering wheel, an accelerator pedals, and a brake pedal.

In a case in which an autonomous driving situation is universally implemented, the driver may select an autonomous driving mode in which the driver does not directly drive the vehicle and the vehicle autonomously travels to the destination.

It is necessary to enable the driver to take a rest comfortably with his feet extended in the autonomous driving mode. If pedals (an accelerator pedal and a brake pedal) positioned in a lower space of a driver seat are kept exposed to the interior of the vehicle, the pedals disturb the driver's relaxation. When a pad of a pedal device is erroneously operated regardless of the driver's intention, there is a risk that an accident occurs.

Therefore, a foldable pedal device configured for an autonomous vehicle is being developed, in which a pedal pad is exposed to protrude toward the driver so that the driver may operate the pedal pad in the manual driving mode in which the driver directly drives the vehicle, and the pedal pad is hidden so as not to protrude toward the driver in the autonomous driving mode so that the pedal pad cannot be operated by the driver, ensuring the driver's comfortable relaxation and implementing safety by preventing an erroneous operation.

However, the foldable pedal device has a drawback in that it is necessary to provide a space for hiding the pedal device in a hidden state, and an operation mechanism is also complicated.

To solve the above-mentioned problems, a technology related to a pressure-operating pedal apparatus is being developed.

The pressure-operating pedal apparatus requires a very small operating displacement of a pedal and has a simple operation mechanism. Furthermore, the pressure-operating pedal apparatus does not require a mechanical configuration related to a foldable function, which provides an advantageous effect of innovatively improving an indoor space of an autonomous driving vehicle.

However, in the case of the pressure-operating pedal apparatus, because the operating displacement of the pedal is very small, it is difficult for a driver to easily recognize a degree to which the driver operates the pedal. Furthermore, the pressure-operating pedal apparatus is operated only by force applied by the driver, the driver's fatigue increases when the driver operates the pressure-operating pedal apparatus over a long time period.

Furthermore, the pressure-operating pedal apparatus requires a mechanism for popping up and hiding the entire pedal apparatus to implement the foldable function. For the present reason, an overall size of the pedal apparatus increases, which makes it difficult to make the pedal apparatus compact.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an electronic pedal apparatus, which is mounted in a vehicle and configured to generate an acceleration signal or a braking signal for the vehicle when a driver operates the electronic pedal apparatus, the electronic pedal apparatus being configured to enable the driver to operate the electronic pedal apparatus with a small effort and to clearly recognize an operating situation of a pedal by use of a magnetic force having a quadratic function graph even though the electronic pedal apparatus operates by fine displacement during an operation of the pedals, and the electronic pedal apparatus also being configured to reduce a degree of fatigue of the driver.

The present disclosure also aims to provide an electronic pedal apparatus, in which a mechanism for implementing a foldable function has a compact size by use of an electromagnet, which makes it possible to simplify a configuration and reduce a weight and costs.

Various aspects of the present disclosure are directed to providing an electronic pedal apparatus including: a pedal housing including a cover; pedals provided to be movable while penetrating the cover; detecting modules provided on the pedal housing and the pedal, respectively and configured to detect an operation of the pedals and generate a signal related to a pedal function of the pedals; and magnetic force modules provided on the pedal housing and the pedals, respectively while facing each other and configured to implement an operating force of the pedals by use of a magnetic force.

The pedals may include an accelerator pedal and a brake pedal provided to be spaced from each other in a leftward-rightward direction thereof.

A pedal flange may be formed to protrude to an outside of the pedals along an external peripheral rim of the pedals, and in a state in which the pedals protrude while penetrating pedal holes formed in the cover, the pedals flange may seal the pedal hole and prevents foreign substances from being introduced into the pedal housing.

A position of the protruding pedal may be restricted when the pedals protrude while penetrating the pedal hole and the pedals flange comes into contact with an internal surface of the cover.

A stopper may be provided on the pedal housing, and a position of the inserted pedal may be restricted when the pedals flange comes into contact with the stopper when the pedals are moved and inserted into the pedal housing.

The detecting modules may include: a first pedal permanent magnet coupled to a lower surface of the pedals; and a printed circuit board (PCB) provided on the pedal housing while facing the first pedal permanent magnet and configured to detect a change in magnetic flux when a position of the first pedal permanent magnet is changed by a movement of the pedals, the PCB being configured to generate a signal related to the pedal function.

The first pedal permanent magnet may be provided as a plurality of first pedal permanent magnets and fixedly coupled to a center portion of the pedals based on a longitudinal direction thereof.

The magnetic force modules may include: a second pedal permanent magnet coupled to the lower surface of the pedals; and a housing magnet provided on the pedal housing while facing the second pedal permanent magnet, and the housing magnet may be a housing permanent magnet or a housing electromagnet that changes in polarity under control of the PCB.

The second pedal permanent magnet may be provided as a plurality of second pedal permanent magnets, the plurality of second pedal permanent magnets may be disposed at two opposite sides of the first pedal permanent magnet with the first pedal permanent magnet interposed therebetween in a longitudinal direction of the pedals, and the housing magnet may be disposed to be matched with the second pedal permanent magnet in a one-to-one manner.

A magnetic force blocking structure may be provided on the pedal housing to surround a periphery of the housing magnet to prevent a magnetic force of the housing magnet from being transmitted to the PCB.

A height of the magnetic force blocking structure may be greater than a height of the housing magnet.

A spacing distance from the magnetic force blocking structure to the PCB may be longer than a spacing distance from the magnetic force blocking structure to the housing magnet.

A magnetic force blocking film may be coupled to a lower surface of the PCB to block a magnetic force of the housing magnet.

The operating force and a foldable function of the pedals may be implemented when the housing magnet is configured as the housing electromagnet.

The housing magnet may be configured as the housing electromagnet, and when the second pedal permanent magnet and the housing electromagnet, which have the same polarity, face each other, the pedals may be moved to protrude to the outside of the cover by a repulsive force and come into a pop-up state.

In a response that a driver operates the pedals in the pop-up state of the pedals, a pedal operating force may be generated by a repulsive force between the second pedal permanent magnet and the housing electromagnet.

In a response that an operating force applied by the driver is released from the pedals, the pedals may be returned to the pop-up state by the repulsive force between the second pedal permanent magnet and the housing electromagnet.

When the second pedal permanent magnet and the housing electromagnet, which have different polarities, face each other, the pedals may be moved and inserted into the pedal housing by an attractive force and come into a hidden state.

Only the operating force may be implemented during the operation of the pedals when the housing magnet is configured as the housing permanent magnet, and when the housing magnet is configured as the housing permanent magnet that has the same polarity as the second pedal permanent magnet and faces the second pedal permanent magnet, the pedals may protrude to the outside of the cover by a repulsive force between the second pedal permanent magnet and the housing permanent magnet, and in a response that the driver operates the protruding pedals, an operating force of the pedals may be generated by the repulsive force.

Various aspects of the present disclosure are directed to providing an electronic pedal apparatus including: a pedal housing; a pedal provided to be movable while penetrating the pedal housing; detecting modules provided on the pedal housing and the pedals, respectively while facing each other and configured to detect an operation of the pedal and generate a signal related to a pedal function of the pedals; magnetic force modules provided on the pedal housing and the pedal, respectively while facing each other and configured to implement an operating force and a foldable function of the pedal by use of a magnetic force; and a printed circuit board (PCB) configured to control the magnetic force modules including an electromagnet to generate an attractive or repulsive force, in which when the repulsive force is generated between the magnetic force modules by the electromagnet under the control of the PCB, a pedal operating force is generated in a response that a driver operates the pedal in a pop-up state in which the pedal protrudes from the pedal housing, and in which when the attractive force is generated between the magnetic force modules by the electromagnet, the pedal comes into a hidden state in which the pedal is inserted into the pedal housing so that the driver cannot operate the pedal.

According to the electronic pedal apparatus according to an exemplary embodiment of the present disclosure, the driver may operate the pedals with a small effort, and the pedals apparatus operates by fine displacement during the operation of the pedal. Furthermore, the pedals apparatus may allow the driver to clearly recognize an operating situation of the pedals by use of the magnetic force (repulsive force) including a quadratic function graph. Therefore, it is possible to reduce a degree of fatigue of the driver when the driver operates the pedal.

Furthermore, the pedals apparatus according to an exemplary embodiment of the present disclosure may implement the compact mechanism having the foldable function by use of the second pedal permanent magnet and the housing electromagnet that changes in polarity under control of the PCB, which makes it possible to simplify the configuration and reduce the weight and costs.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
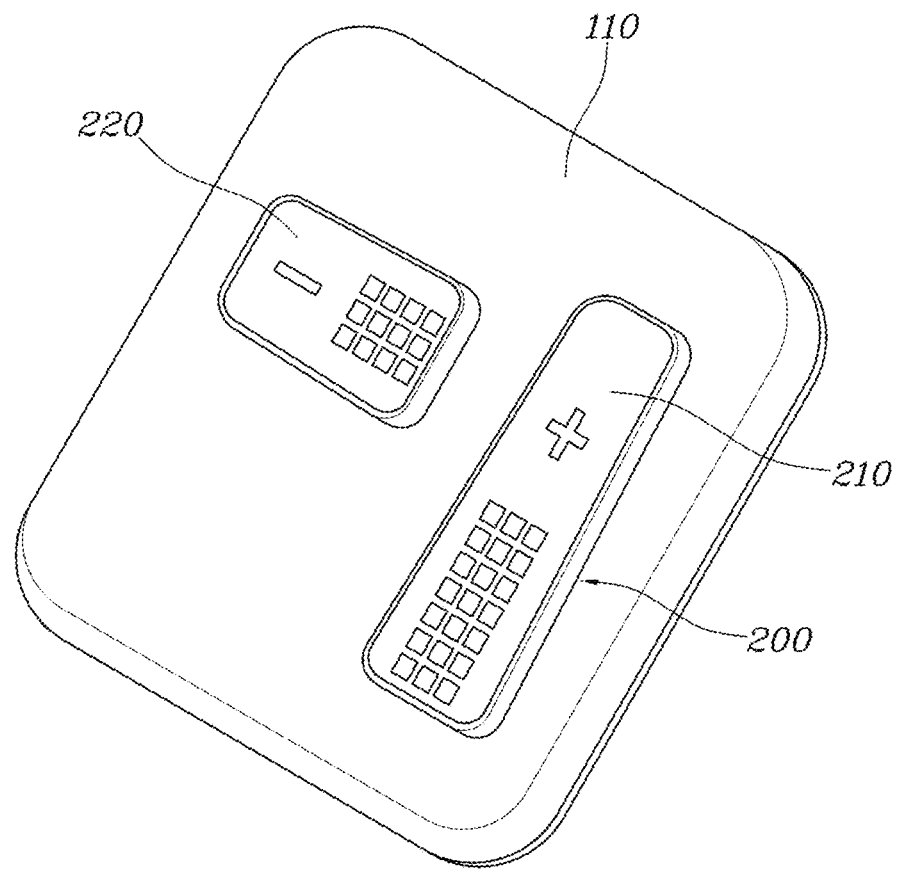
FIG. 1 is a perspective view of an electronic pedal apparatus according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, embodiments included in the present specification will be described in detail with reference to the accompanying drawings. The same or similar constituent elements are assigned with the same reference numerals regardless of reference numerals, and the repetitive description thereof will be omitted.

The suffixes "module", "unit", "part", and "portion" used to describe constituent elements in the following description are used together or interchangeably to facilitate the description, but the suffixes themselves do not have distinguishable meanings or functions.

In the detailed description included in the present specification, the specific descriptions of publicly known related technologies will be omitted when it is determined that the specific descriptions may obscure the subject matter of the exemplary embodiments included in the present specification.

Furthermore, it may be interpreted that the accompanying drawings are provided only to allow those skilled in the art to easily understand the exemplary embodiments included in the present specification, and the technical spirit included in the present specification is not limited by the accompanying drawings, and includes all alterations, equivalents, and alternatives that are included in the spirit and the technical scope of the present disclosure.

The terms including ordinal numbers such as "first," "second," and the like may be used to describe various constituent elements, but the constituent elements are not limited by the terms. These terms are used only to distinguish one constituent element from another constituent element.

When one constituent element is described as being "coupled" or "connected" to another constituent element, it should be understood that one constituent element may be coupled or directly connected to another constituent element, and an intervening constituent element can also be present between the constituent elements.

When one constituent element is described as being "directly coupled to" or "directly connected to" another constituent element, it should be understood that no intervening constituent element is present between the constituent elements.

Singular expressions include plural expressions unless clearly described as different meanings in the context.

In the present specification, it should be understood the terms "comprises," "comprising," "includes," "including," "containing," "has," "having" or other variations thereof are inclusive and therefore specify the presence of stated features, integers, steps, operations, elements, components, or combinations thereof, but do not preclude the presence or addition of one or more other features, integers, steps, operations, elements, components, or combinations thereof.

Furthermore, the term "control unit" or "unit" included in the name of "motor control unit (MCU)" or "hybrid control unit (HCU)" is merely a term widely used to name a control device (controller or control unit) for controlling a vehicle function but does not mean a generic function unit.

A controller may include a communication device configured to communicate with another control unit or a sensor to control a corresponding function, a memory configured to store an operating system, a logic instruction, and input/output information, and one or more processors configured to perform determination, computation, decision, or the like required to control the corresponding function.

Hereinafter, an electronic pedal apparatus according to various exemplary embodiments of the present disclosure will be described with reference to the accompanying drawings.

The electronic pedal apparatus according to an exemplary embodiment of the present disclosure is configured as an organ-type pedal apparatus. As illustrated in FIGS. 1 to 6, the electronic pedal apparatus includes: a pedal housing 100 including a cover 110; pedals 200 provided to be movable while penetrating the cover 110; detecting modules 300 respectively provided on the pedal housing 100 and the pedal 200 while facing each other and configured to detect an operation of the pedal 200 and generate related to a pedal function; and magnetic force modules 400 respectively provided on the pedal housing 100 and the pedal 200 while facing each other and configured to implement both an operating force and a foldable function of the pedal 200 or implement only the operating force of the pedal by use of a magnetic force.

The pedal housing 100 is fixed in a lower space of a driver seat and has a hollow box shape. The cover 110 is coupled to the pedal housing 100 to cover an opened upper side of the pedal housing 100.

Pedal holes 111 are formed in the cover 110, and the pedals 200 are provided to penetrate the pedal holes 111.

The pedals 200 are rectilinearly moved by operation of the driver. The pedals 200 include an accelerator pedal 210 and a brake pedal 220 provided on the pedal housing 100 and spaced from each other in a leftward-rightward direction thereof.

The accelerator pedal 210 and the brake pedal 220 are respectively provided in a perpendicular direction and a horizontal direction, which makes it possible to prevent the accelerator pedal 210 and the brake pedal 220 from erroneously operating.

When the driver operates the accelerator pedal 210, the detecting module 300 generates a signal related to acceleration of the vehicle. When the driver operates the brake pedal 220, the detecting module 300 generates a signal related to braking of vehicle.

The foldable function of the pedal 200 is a function of switching a state to a pop-up state in which the pedal 200 protrudes to the outside of the cover 110 so that the driver may operate the pedal 200 and a hidden state in which the pedal 200 is hidden by being inserted into the pedal housing 100 so that the driver cannot operate the pedal 200.

The vehicle may travel in a manual operation mode when the pedal 200 is in the pop-up state, and the vehicle travels in an autonomous driving mode when the pedal 200 is in the hidden state.

In the exemplary embodiment of the present disclosure, the accelerator pedal 210 and the brake pedal 220 are different only in shapes but operate in the same way, and the detecting module 300 and the magnetic force module 400 also have a same configuration. Therefore, hereinafter, the accelerator pedal 210 and the brake pedal 220 will be collectively described as the pedal 200 without being independently described.

According to an exemplary embodiment of the present disclosure, a pedal flange 230 protrudes to the outside along an external peripheral rim of the pedal 200. In the state in which the pedal 200 protrudes while penetrating the pedal hole 111 of the cover 110, the pedal flange 230 is configured to seal the pedal hole 111 to prevent foreign substances from being introduced into the pedal housing 100.

Figure 2:
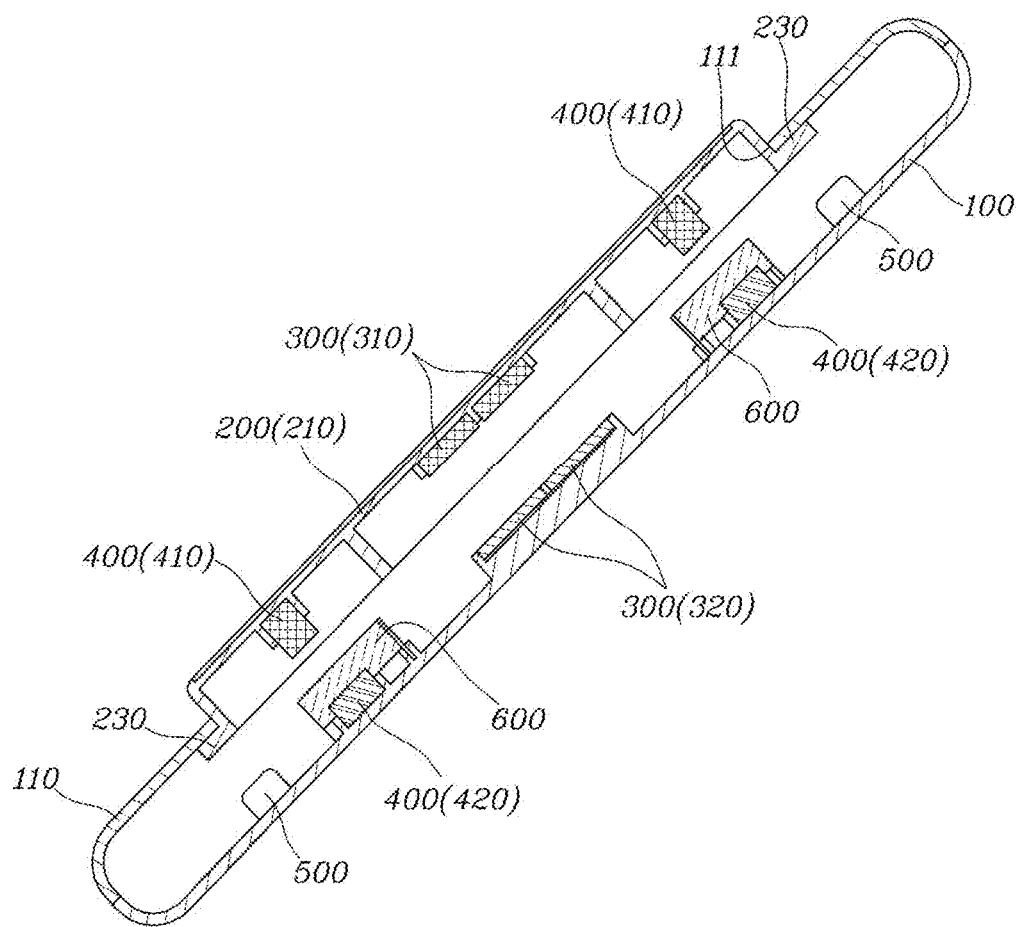
FIG. 2 is a cross-sectional view of FIG. 1.
Figure 3:
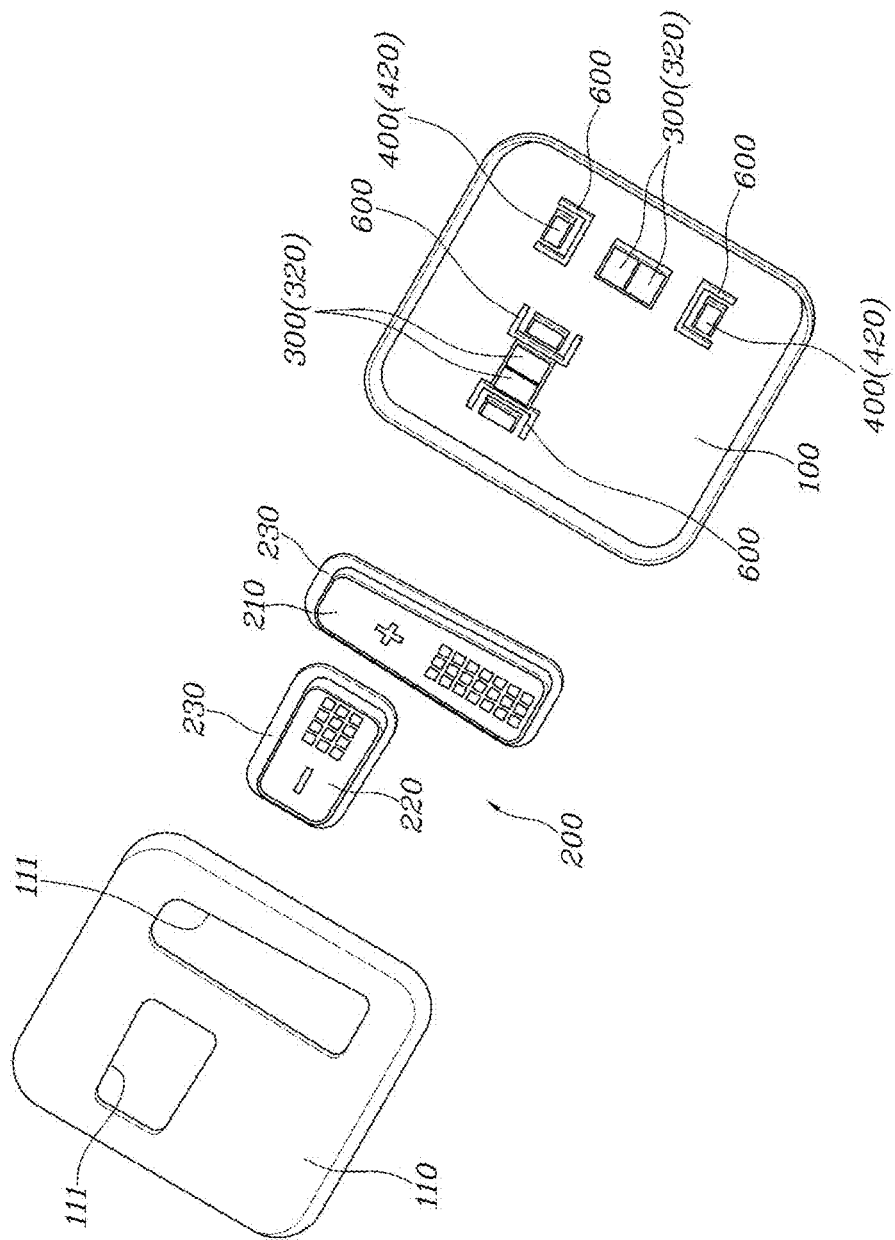
FIG. 3 is an exploded view of FIG. 1.
Figure 4:
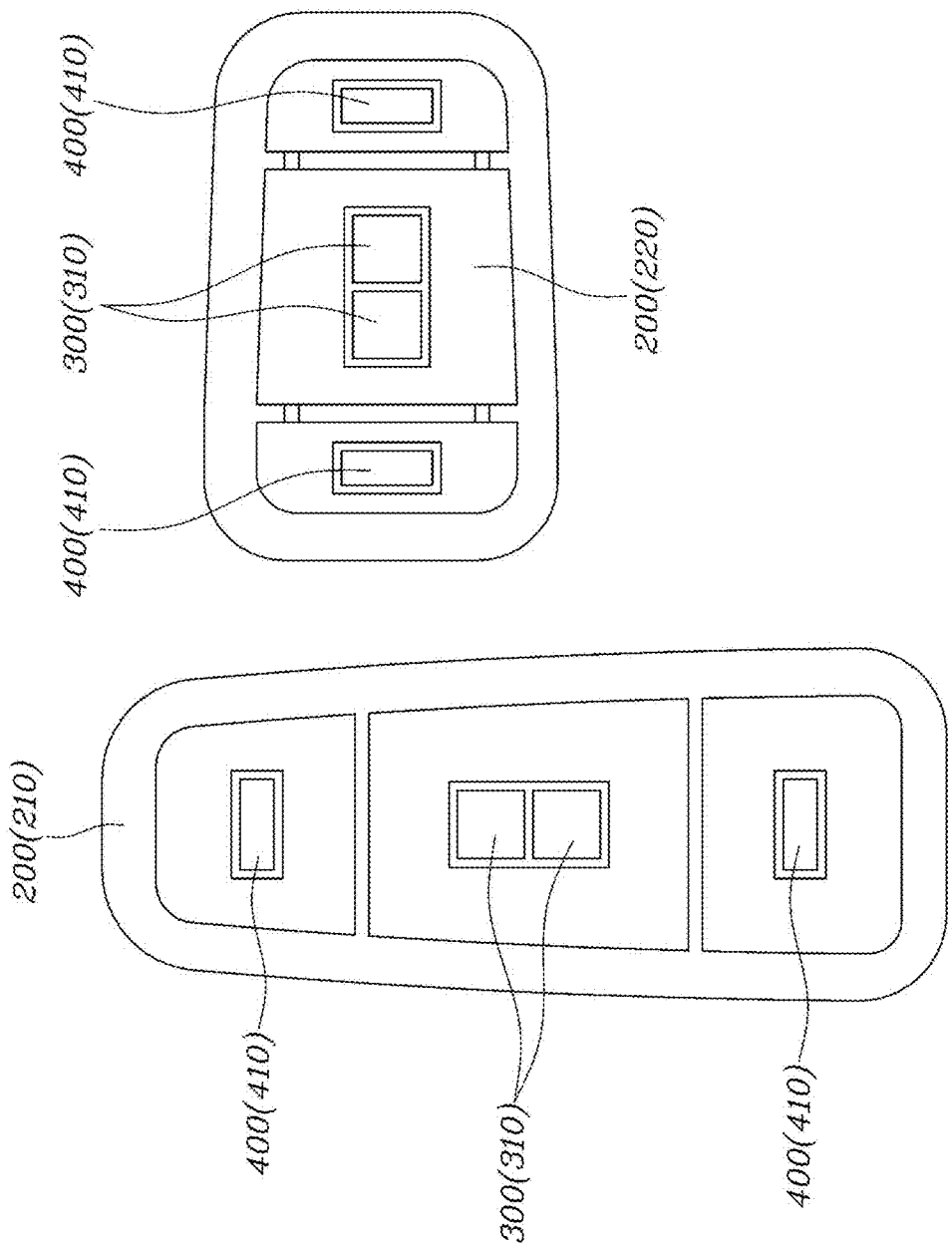
FIG. 4 is a view exemplarily illustrating that a detecting module and a magnetic force module are coupled to a lower surface of a pedal according to an exemplary embodiment of the present disclosure.
Figure 5:
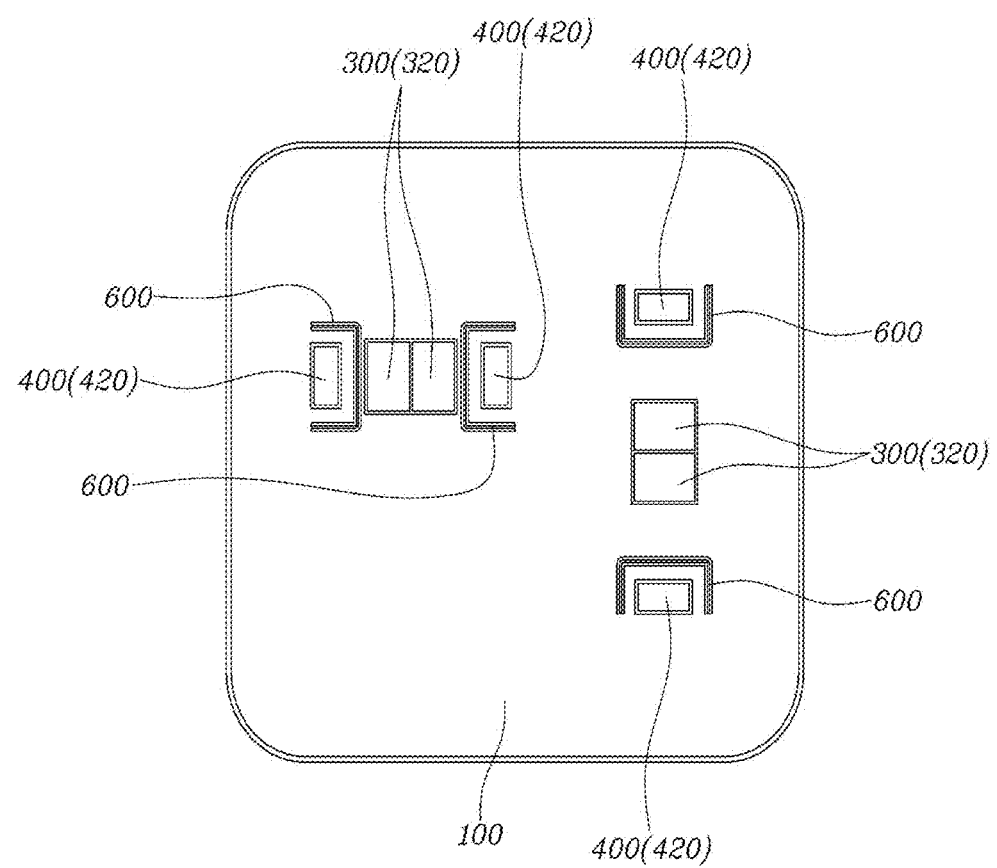
FIG. 5 is a view exemplarily illustrating that the detecting module and the magnetic force module are coupled to a pedal housing according to an exemplary embodiment of the present disclosure.

As illustrated in FIG. 2, a position of the protruding pedal 200 is restricted when the pedal 200 protrudes while penetrating the pedal hole 111 and the pedal flange 230 is in contact with an internal surface of the cover 110. Therefore, an initial position or a restoration of the pedal 200 or a position of the pop-up state is restricted.

Figure 8:
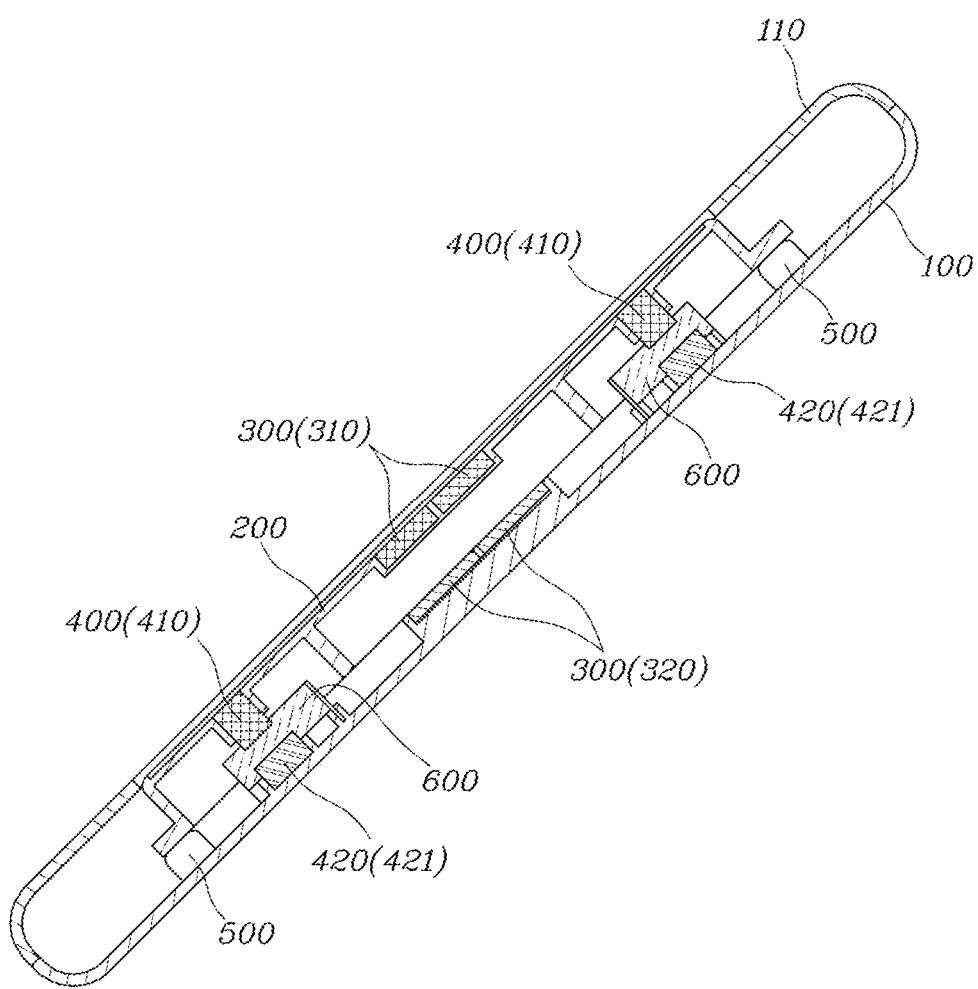

According to an exemplary embodiment of the present disclosure, a plurality of stoppers 500 is provided on the pedal housing 100. As illustrated in FIG. 8, when the pedal 200 is moved and inserted into the pedal housing 100 and the pedal flange 230 comes into contact with the stopper 500, a position of the inserted pedal 200 is restricted. Therefore, a full stroke position of the pedal 200 or a position of the hidden state is restricted.

The detecting modules 300 according to an exemplary embodiment of the present disclosure include: a first pedal permanent magnet 310 coupled to a lower surface of the pedal 200; and a printed circuit board (PCB) 320 provided on the pedal housing 100 while facing the first pedal permanent magnet 310 and configured to detect a change in magnetic flux when a position of the first pedal permanent magnet 310 is changed by a movement of the pedal 200, the PCB 320 being configured to generate a signal related to the pedal function.

The PCB 320 includes a Hall sensor configured to detect a change in magnetic flux.

The first pedal permanent magnet 310 may be provided as a plurality of first pedal permanent magnets 310 which may implement a fail-safe function. The first pedal permanent magnet 310 may be fixed to a center portion of the pedal 200 based on a longitudinal direction and generate a stable signal.

The magnetic force modules 400 according to an exemplary embodiment of the present disclosure include: a second pedal permanent magnet 410 coupled to the lower surface of the pedal 200; and a housing magnet 420 provided on the pedal housing 100 while facing the second pedal permanent magnet 410.

The housing magnet 420 may be a housing electromagnet 421 or a housing permanent magnet 422 that changes in polarity under control of the PCB 320.

The second pedal permanent magnet 410 may be provided as a plurality of second pedal permanent magnets 410, and the plurality of second pedal permanent magnets 410 is disposed at two opposite sides of the first pedal permanent magnet 310 with the first pedal permanent magnet 310 interposed therebetween in the longitudinal direction of the pedal 200, implementing a fail-safe function and generating a stable signal.

Furthermore, the housing magnet 420 is disposed on the pedal housing 100 while being matched with the second pedal permanent magnet 410 in a one-to-one manner.

A magnetic force blocking structure 600 is provided on the pedal housing 100 to surround a periphery of the housing magnet 420 to prevent a magnetic force, which is generated from the housing magnet 420, from being transmitted to the PCB 320.

When the magnetic force of the housing magnet 420 is transmitted to the PCB 320, the magnetic force affects the Hall sensor, which may cause a concern that the PCB 320 cannot generate a correct signal related to the pedal function. To prevent the concern, the magnetic force blocking structure 600 is provided to surround the periphery of the housing magnet 420.

For example, the magnetic force blocking structure 600 may be Mu Metal, which is a nickel alloy having a high nickel (Ni) content.

The magnetic force blocking structure 600 has a cross-section having a "U" shape or an O shape and is provided to surround the periphery of the housing magnet 420. Therefore, the magnetic force blocking structure 600 blocks a direction toward the PCB 320, preventing the magnetic force of the housing magnet 420 from being transmitted to the PCB 320.

Figure 6:
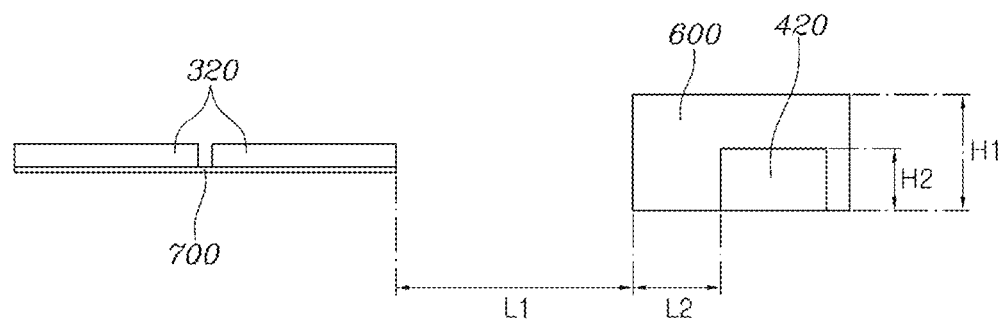
FIG. 6 is a view for explaining a magnetic force blocking structure according to an exemplary embodiment of the present disclosure.

As illustrated in FIG. 6, a height H1 of the magnetic force blocking structure 600 may be greater than a height H2 of the housing magnet 420 to prevent the magnetic force of the housing magnet 420 from being transmitted to the PCB 320.

Furthermore, as illustrated in FIG. 6, a spacing distance L1 from the magnetic force blocking structure 600 to the PCB 320 may be longer than a spacing distance L2 from the magnetic force blocking structure 600 to the housing magnet 420 to prevent the magnetic force of the housing magnet 420 from being transmitted to the PCB 320.

Furthermore, as illustrated in FIG. 6, a magnetic force blocking film 700 may be additionally coupled to the lower surface of the PCB 320 to prevent the magnetic force of the housing magnet 420 from being transmitted to the PCB 320. The magnetic force blocking film 700 may be made of the same material as the magnetic force blocking structure 600.

Figure 7:
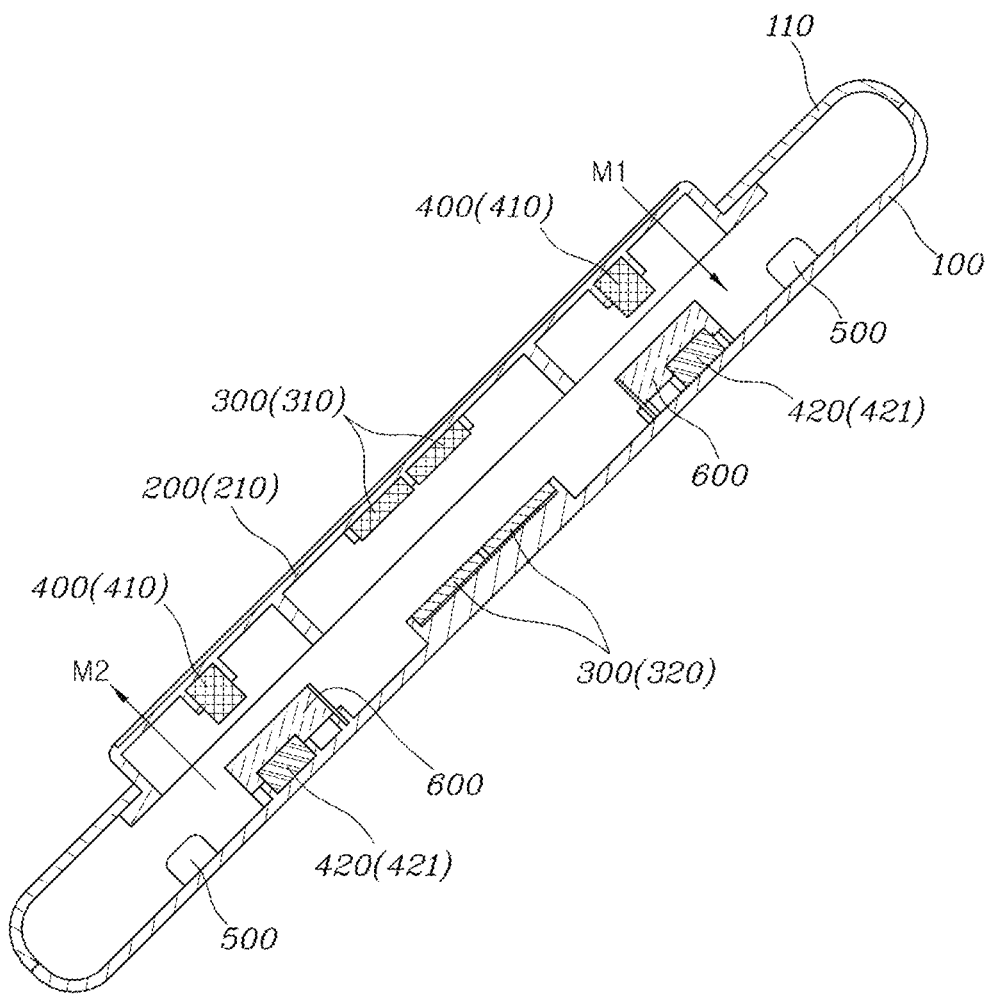
FIG. 7 and FIG. 8 are views for explaining an exemplary embodiment in which a housing magnet is configured as a housing electromagnet according to an exemplary embodiment of the present disclosure and illustrating a state in which a pedal is popped up and a state in which the pedal is hidden.

FIG. 7 and FIG. 8 illustrate an example in which the housing magnet 420 is configured as the housing electromagnet 421. As illustrated, when the housing magnet 420 is configured as the housing electromagnet 421, it is possible to implement the operating force and the foldable function of the pedal 200.

FIG. 7 illustrates a situation in which the second pedal permanent magnet 410 and the housing electromagnet 421, which have the same polarity (N-pole and N-pole or S-pole and S-pole), face each other by electric current control of the PCB 320. In the instant case, the pedal 200 is moved to protrude to the outside of the cover 110 by a repulsive force between the second pedal permanent magnet 410 and the housing electromagnet 421, and thus the pedal 200 is kept in the pop-up state.

When the driver operates the pedal 200 in the pop-up state of the pedal 200 illustrated in FIG. 7, the pedal 200 is moved and inserted into the pedal housing 100 (arrow M1). In the instant case, a pedal operating force is generated by the repulsive force between the second pedal permanent magnet 410 and the housing electromagnet 421.

The driver may operate the pedal apparatus according to an exemplary embodiment of the present disclosure with a small effort, and the pedal apparatus operates by fine displacement during the operation of the pedal. Furthermore, the pedal apparatus may allow the driver to clearly recognize an operating situation of the pedal 200 by use of the magnetic force (repulsive force) having a quadratic function graph and generated between the second pedal permanent magnet 410 and the housing electromagnet 421. Therefore, it is possible to reduce a degree of fatigue of the driver when the driver operates the pedal.

When the driver releases the operating force from the pedal 200 in the state in which the pedal 200 is operated by being pushed by the driver, the pedal 200, which has been moved and inserted into the pedal housing 100, is moved, as indicated by the arrow M2, by the repulsive force between the second pedal permanent magnet 410 and the housing electromagnet 421 and returned to the pop-up state.

FIG. 8 illustrates a situation in which the second pedal permanent magnet 410 and the housing electromagnet 421, which have different polarities (N-pole and S-pole or S-pole and N-pole), face each other by electric current control of the PCB 320. In the instant case, the pedal 200 is moved and inserted into the pedal housing 100 by an attractive force between the second pedal permanent magnet 410 and the housing electromagnet 421 and thus kept in the hidden state.

When the polarity of the second pedal permanent magnet 410 and the polarity of the housing electromagnet 421 become identical to each other as the polarity of the housing electromagnet 421 is changed by the electric current control of the PCB 320 in the hidden state illustrated in FIG. 8, the pedal 200 is moved to protrude to the outside of the cover 110 by the repulsive force between the second pedal permanent magnet 410 and the housing electromagnet 421 so that the pedal 200 switches to the pop-up state illustrated in FIG. 7.

The pedal apparatus according to an exemplary embodiment of the present disclosure may implement the compact mechanism having the foldable function by use of the second pedal permanent magnet 410 and the housing electromagnet 421 that changes in polarity under control of the PCB 320, which makes it possible to simplify the configuration and reduce the weight and costs.

Figure 9:
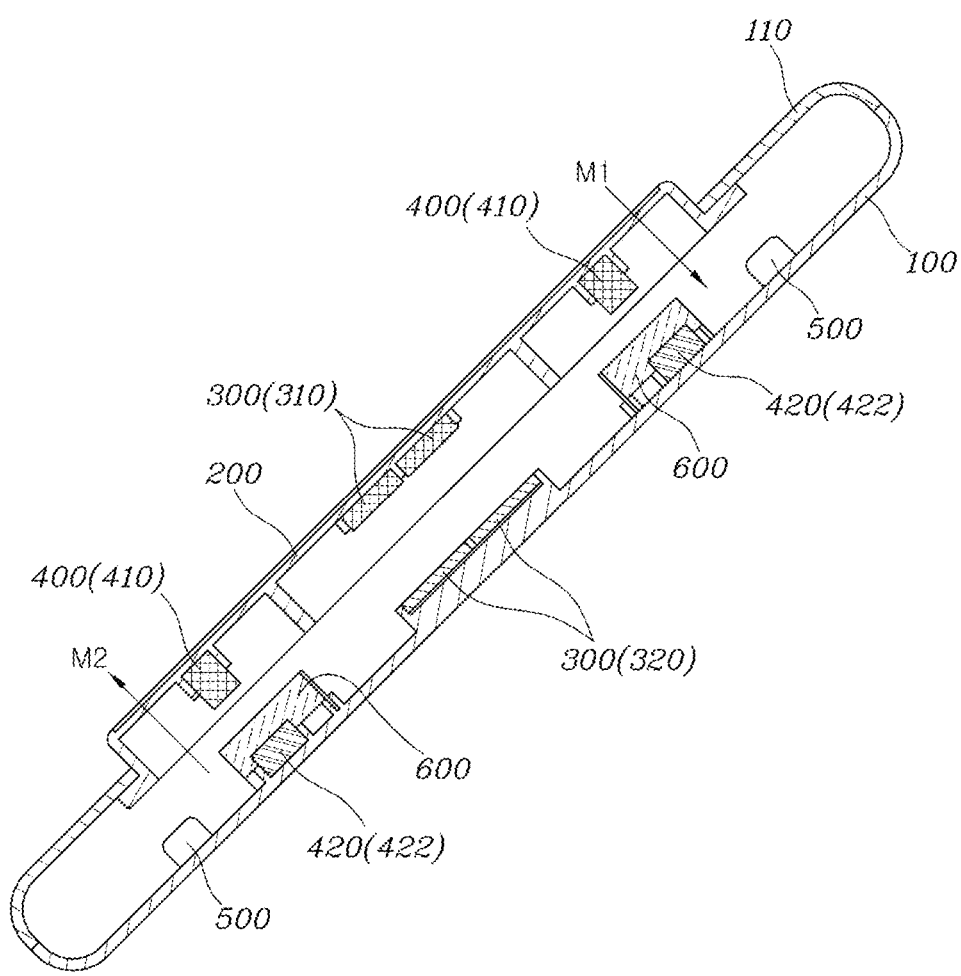
FIG. 9 is a view for explaining an exemplary embodiment in which the housing magnet is configured as a housing permanent magnet according to an exemplary embodiment of the present disclosure.

FIG. 9 illustrates another example in which the housing magnet 420 is configured as the housing permanent magnet 422. As illustrated, when the housing magnet 420 is configured as the housing permanent magnet 422, only the operating force of the pedal 200 is implemented during the operation of the pedal.

As illustrated, the second pedal permanent magnet 410 and the housing permanent magnet 422, which have the same polarity (N-pole and N-pole or S-pole and S-pole), face each other. In the instant case, the pedal 200 is moved to protrude to the outside of the cover 110 by the repulsive force between the second pedal permanent magnet 410 and the housing permanent magnet 422 and thus kept in the pop-up state.

When the driver operates the pedal 200 in the pop-up state of the pedal 200 illustrated in FIG. 9, the pedal 200 is moved and inserted into the pedal housing 100 (arrow M1). In the instant case, a pedal operating force is generated by the repulsive force between the second pedal permanent magnet 410 and the housing permanent magnet 422.

The driver may operate the pedal apparatus according to an exemplary embodiment of the present disclosure with a small effort, and the pedal apparatus operates by fine displacement during the operation of the pedal. Furthermore, the pedal apparatus may allow the driver to clearly recognize an operating situation of the pedal 200 by use of the magnetic force (repulsive force) having a quadratic function graph and generated between the second pedal permanent magnet 410 and the housing permanent magnet 422. Therefore, it is possible to reduce a degree of fatigue of the driver when the driver operates the pedal.

When the driver releases the operating force from the pedal 200 in the state in which the pedal 200 is operated by being pushed by the driver, the pedal 200, which has been moved and inserted into the pedal housing 100, is moved, as indicated by the arrow M2, by the repulsive force between the second pedal permanent magnet 410 and the housing permanent magnet 422 and returned to the pop-up state.

Furthermore, the electronic pedal apparatus according to various exemplary embodiments of the present disclosure may include the pedal housing 100; the pedal 200 provided to be movable while penetrating the pedal housing 100; the detecting modules 300 respectively provided on the pedal housing 100 and the pedal 200 while facing each other and configured to detect the operation of the pedal 200 and generate the signal related to the pedal function; the magnetic force modules 400 respectively provided on the pedal housing 100 and the pedal 200 while facing each other and configured to implement the operating force and the foldable function of the pedal by use of the magnetic force; and the PCB 320 configured to control the magnetic force modules 400 including the electromagnet to generate an attractive or repulsive force, in which when the repulsive force is generated between the magnetic force modules 400 by the electromagnet under the control of the PCB 320, the pedal operating force is generated as the driver operates the pedal 200 in the pop-up state in which the pedal 200 protrudes from the pedal housing 100, and in which when the attractive force is generated between the magnetic force modules 400 by the electromagnet, the pedal 200 comes into the hidden state in which the pedal 200 is inserted into the pedal housing 100 so that the driver cannot operate the pedal 200.

As described above, according to the electronic pedal apparatus according to an exemplary embodiment of the present disclosure, the driver may operate the pedal 200 with a small effort, and the pedal apparatus operates by fine displacement during the operation of the pedal. Furthermore, the pedal apparatus may allow the driver to clearly recognize an operating situation of the pedal 200 by use of the magnetic force (repulsive force) having a quadratic function graph. Therefore, it is possible to reduce a degree of fatigue of the driver when the driver operates the pedal.

Furthermore, the pedal apparatus according to an exemplary embodiment of the present disclosure may implement the compact mechanism having the foldable function by use of the second pedal permanent magnet 410 and the housing electromagnet 421 that changes in polarity under control of the PCB 320, which makes it possible to simplify the configuration and reduce the weight and costs.

In an exemplary embodiment of the present disclosure, the PCB 320 may include a controller.

In addition, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method disclosed in the aforementioned various exemplary embodiments of the present invention.

The aforementioned invention can also be embodied as computer readable codes on a computer readable recording medium. The computer readable recording medium is any data storage device that can store data which can be thereafter read by a computer system and store and execute program instructions which can be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc. and implementation as carrier waves (e.g., transmission over the Internet). Examples of the program instruction include machine language code such as those generated by a compiler, as well as high-level language code that may be executed by a computer using an interpreter or the like.

In an exemplary embodiment of the present invention, each operation described above may be performed by a control device, and the control device may be configured by multiple control devices, or an integrated single control device.

In an exemplary embodiment of the present invention, the scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

In an exemplary embodiment of the present invention, the control device may be implemented in a form of hardware or software, or may be implemented in a combination of hardware and software.

In addition, the terms such as "unit", "module", etc. disclosed in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An electronic pedal apparatus comprising:
    a pedal housing including a cover;
    pedals provided to be movable while penetrating the cover;
    detecting modules provided on the pedal housing and the pedals, respectively and configured to detect an operation of the pedals and generate a signal related to a pedal function of the pedals; and
    magnetic force modules provided on the pedal housing and the pedals, respectively while facing each other and configured to implement an operating force of the pedals by use of a magnetic force,
    wherein the detecting modules include:
        a first pedal permanent magnet coupled to a lower surface of the pedals; and
        a printed circuit board (PCB) provided on the pedal housing while facing the first pedal permanent magnet and configured to detect a change in magnetic flux applied to the PCB when a position of the first pedal permanent magnet is changed by a movement of the pedals, the PCB being configured to generate the signal related to the pedal function, and
        wherein the first pedal permanent magnet is in plural and fixedly coupled to a center portion of the pedals based on a longitudinal direction thereof.

2. The electronic pedal apparatus of claim 1, wherein the pedals include an accelerator pedal and a brake pedal provided to be spaced from each other in a leftward-rightward direction thereof.

3. The electronic pedal apparatus of claim 1,
wherein the pedals includes a pedal flange formed on the pedals to protrude to an outside of the pedals along an external peripheral rim of the pedals, and
wherein in a state in which the pedals protrude while penetrating pedal holes formed in the cover, the pedals flange seals the pedal holes to prevent foreign substances from being introduced into the pedal housing through the pedals holes.

4. The electronic pedal apparatus of claim 3, wherein a position of the protruding pedals are restricted when the pedals protrude while penetrating the pedal holes and the pedals flange comes into contact with an internal surface of the cover.

5. The electronic pedal apparatus of claim 3, further including a stopper provided on the pedal housing,
wherein a position of the inserted pedals are restricted when the pedals flange comes into contact with the stopper when the pedals are moved and inserted into the pedal housing.

6. The electronic pedal apparatus of claim 1, wherein the magnetic force modules include:
a second pedal permanent magnet coupled to the lower surface of the pedals; and
a housing magnet provided on the pedal housing while facing the second pedal permanent magnet, and
wherein the housing magnet is a housing permanent magnet or a housing electromagnet that changes in polarity under control of the PCB.

7. The electronic pedal apparatus of claim 6, wherein the second pedal permanent magnet is in plural and the plurality of second pedal permanent magnets is disposed at first and second opposite sides of the first pedal permanent magnet with the first pedal permanent magnet interposed therebetween in a longitudinal direction of the pedals, and the housing magnet is disposed to be matched with the plurality of second pedal permanent magnets in a one-to-one manner.

8. The electronic pedal apparatus of claim 6, wherein a magnetic force blocking structure is provided on the pedal housing to surround a periphery of the housing magnet to prevent a magnetic force of the housing magnet from being transmitted to the PCB.

9. The electronic pedal apparatus of claim 8, wherein a height of the magnetic force blocking structure is greater than a height of the housing magnet.

10. The electronic pedal apparatus of claim 8, wherein a spacing distance from the magnetic force blocking structure to the PCB is longer than a spacing distance from the magnetic force blocking structure to the housing magnet.

11. The electronic pedal apparatus of claim 6, wherein a magnetic force blocking film is coupled to a lower surface of the PCB to block a magnetic force of the housing magnet.

12. The electronic pedal apparatus of claim 6, wherein the operating force and a foldable function of the pedals are implemented when the housing magnet is configured as the housing electromagnet.

13. The electronic pedal apparatus of claim 12,
wherein the housing magnet is configured as the housing electromagnet, and
wherein when the second pedal permanent magnet and the housing electromagnet, which have a same polarity, face each other, the pedals are moved to protrude to the outside of the cover by a repulsive force and come into a pop-up state.

14. The electronic pedal apparatus of claim 13, wherein in a response that a driver operates the pedals in the pop-up state of the pedals, a pedal operating force is generated by a repulsive force between the second pedal permanent magnet and the housing electromagnet.

15. The electronic pedal apparatus of claim 14, wherein in a response that an operating force applied by the driver is released from the pedals, the pedals are returned to the pop-up state by the repulsive force between the second pedal permanent magnet and the housing electromagnet.

16. The electronic pedal apparatus of claim 13, wherein when the second pedal permanent magnet and the housing electromagnet, which have different polarities, face each other, the pedals are moved and inserted into the pedal housing by an attractive force and come into a hidden state.

17. The electronic pedal apparatus of claim 6,
wherein only the operating force is implemented during the operation of the pedals when the housing magnet is configured as the housing permanent magnet,
wherein when the housing magnet is configured as the housing permanent magnet that has a same polarity as the second pedal permanent magnet and faces the second pedal permanent magnet, the pedals protrude to the outside of the cover by a repulsive force between the second pedal permanent magnet and the housing permanent magnet, and
wherein in a response that the driver operates the protruding pedals, an operating force of the pedals are generated by the repulsive force.

18. An electronic pedal apparatus comprising:
a pedal housing;
a pedal provided to be movable while penetrating the pedal housing;
detecting modules provided on the pedal housing and the pedal, respectively while facing each other and configured to detect an operation of the pedal and generate a signal related to a pedal function;
magnetic force modules provided on the pedal housing and the pedal, respectively while facing each other and configured to implement an operating force and a foldable function of the pedal by use of a magnetic force; and
a printed circuit board (PCB) configured to control the magnetic force modules including an electromagnet to generate an attractive or repulsive force,
wherein the detecting modules include:
a first pedal permanent magnet coupled to a lower surface of the pedal; and
a printed circuit board (PCB) provided on the pedal housing while facing the first pedal permanent magnet and configured to detect a change in magnetic flux applied to the PCB when a position of the first pedal permanent magnet is changed by a movement of the pedal the PCB being configured to generate a signal related to the pedal function,
wherein the magnetic force modules include:
a second pedal permanent magnet coupled to the lower surface of the pedal; and
a housing magnet provided on the pedal housing while facing the second pedal permanent magnet, and
wherein the housing magnet is a housing permanent magnet or a housing electromagnet that changes in polarity under control of the PCB
wherein a magnetic force blocking structure is provided on the pedal housing to surround a periphery of the housing magnet to prevent a magnetic force of the housing magnet from being transmitted to the PCB,
wherein when the repulsive force is generated between the magnetic force modules by the electromagnet under control of the PCB, a pedal operating force is generated in a response that a driver operates the pedal in a pop-up state in which the pedal protrudes from the pedal housing, and wherein when the attractive force is generated between the magnetic force modules by the electromagnet, the pedal comes into a hidden state in which the pedal is inserted into the pedal housing so that the driver cannot operate the pedal.

19. An electronic pedal apparatus comprising:

a pedal housing including a cover;

pedals provided to be movable while penetrating the cover;

detecting modules provided on the pedal housing and the pedals, respectively and configured to detect an operation of the pedals and generate a signal related to a pedal function of the pedals; and magnetic force modules provided on the pedal housing and the pedals, respectively while facing each other and configured to implement an operating force of the pedals by use of a magnetic force, wherein the detecting modules include:
  a first pedal permanent magnet coupled to a lower surface of the pedals; and
  a printed circuit board (PCB) provided on the pedal housing while facing the first pedal permanent magnet and configured to detect a change in magnetic flux applied to the PCB when a position of the first pedal permanent magnet is changed by a movement of the pedals, the PCB being configured to generate the signal related to the pedal function, wherein the magnetic force modules include:
  a second pedal permanent magnet coupled to the lower surface of the pedals; and
  a housing magnet provided on the pedal housing while facing the second pedal permanent magnet, wherein the housing magnet is a housing permanent magnet or a housing electromagnet that changes in polarity under control of the PCB, and wherein a magnetic force blocking structure is provided on the pedal housing to surround a periphery of the housing magnet to prevent a magnetic force of the housing magnet from being transmitted to the PCB.

* * * * *